Patented Dec. 2, 1952

2,620,340

UNITED STATES PATENT OFFICE 2,620,340

2-AMINO-4-HYDROXY-7-PTERIDYL DERIVATIVES

Souren Avakian, Oreland, and Gustav J. Martin, Philadelphia, Pa., assignors to The National Drug Company, Philadelphia, Pa., a corporation of Pennsylvania No Drawing. Application September 2, 1948, Serial No. 47,533

3 Claims. (Cl. 260—251.5)

This invention pertains to a new class of displacing agents for folic acid. More particularly, it refers to certain 2-amino-4-hydroxy-7-pteridyl derivatives which have the unexpected property of behaving in a manner diametrically opposed to the action of folic acid.

It is an object of this invention to produce a new class of therapeutically active chemicals which are capable of favorably altering the course of bacterial infections attributable directly or indirectly to streptococci, staphylococci and pneumococci. Additional objects will become apparent from a consideration of the following description and claims.

In accordance with our invention we achieve the foregoing and other objectives by preparing and employing the new chemical compounds 4(((2 - amino - 4- hydroxy - 7 - pteridyl)methyl)amino)benzoic acid and its amino acid derivatives, particularly N(4(((2-amino-4-hydroxy-7-pteridyl)methyl)amino)benzoyl)glutamic acid. We have found that these compounds are physiologically the direct antithesis of folic acid in that they displace this important physiological compound from certain systems wherein it exerts a profound effect upon the activities of the body. As a result of this unexpected displacing property, these compounds exert their beneficial actions. As mentioned previously they alter markedly the course of bacterial infections attributable to streptococci, staphylococci and pneumococci, vigorously attacking and destroying these bacteria wherever they occur in the body. They also have the specific and desirable capacity of inhibiting the action of dopa decarboxylase by virtue of which they lower the blood pressure. The foregoing and other advantages of our compounds are attributable to their ability to displace folic acid. This property is most unexpected since from the standpoint of chemical structure our compounds have much in common with folic acid and would naturally be expected to possess the physiological properties of this material to a greater or lesser extent rather than diametrically opposing properties.

Our compounds do not evidence any harmful side reactions as is the case with numerous chemotherapeutics. They may be taken in dosages of widely varying amounts depending upon the desire of the prescribing physician and the condition of the patient. As a general average a dosage of about 5 milligrams per kilogram of body weight is sufficient to produce a profound improvement in the patient. Our compounds may be employed as such or in admixture with other therapeutic materials. When used in the form of powder, tablets, capsules, liquid suspensions, solutions, etc., it is to be understood that the customary extenders, coatings, solvents, suspending agents and the like may be employed. Since our compounds may be administered orally, intravenously, or intramuscularly, they are readily adaptable to a wide variety of prescriptions.

The invention may be more readily understood by a consideration of the following illustrative examples wherein a satisfactory process for the preparation of our compounds is set forth.

EXAMPLE 1

*Preparation of N(4(((2-amino-4-hydroxy-7-pteridyl)methyl)amino)benzoyl)glutamic acid*

A mixture of 50 g. of 2,4,5-triamino-6-hydroxypyrimidine dihydrochloride and 50 g. of 30% methylglyoxal was dissolved in two liters of 0.5N sodium hydroxide solution. After heating on the steam bath for two hours the solution was cooled and neutralized to pH 3.5. The precipitate was filtered, dissolved in dilute sodium hydroxide solution and then precipitated as the sodium salt by addition of 10 N sodium hydroxide solution. The crystallized salt was then dissolved in water, decolorized with charcoal and precipitated at pH 3.5. It is a yellow crystalline product.

2. *Preparation of 2-amino-4-hydroxy-7-bromomethylpteridine*

Seventeen g. of 2-amino-4-hydroxy-7-methylpteridine and 17 cc. of bromine was added to 500 cc. of 48% hydrobromic acid and the mixture heated with stirring on a steam bath. After five hours the solution was concentrated under reduced pressure and the concentrate added to 2 liters of cold water. The precipitate was filtered, washed with water and then with ether. Yield of the crystalline yellow product was 24 grams.

3. *Preparation of N(4(((2-amino-4-hydroxy-7-pteridyl)methyl)amino)benzoyl)glutamic acid*

Ten grams of 2-amino-4-hydroxy-7-bromomethylpteridine prepared as aforesaid and 15 g. of diethyl N-(p-aminobenzoyl) glutamic acid was added to 400 cc. of ethylene glycol and the mixture heated with stirring at 110–115°. After four hours the solution was cooled, diluted with 600 cc. of acetone and the precipitate filtered and washed with ethanol. The product was dissolved in 4 liters of .1N sodium hydroxide solution and allowed to stand at room temperature for fifteen hours. Neutralization to pH 3.5 gave a light colored precipitate. The product was purified by repeatedly dissolving it in dilute sodium hydroxide solution and precipitating at pH 3.5. The yield was 2 grams.

EXAMPLE 2

*Preparation of 4(((2 - amino - 4 - hydroxy - 7-pteridyl) methyl) amino) benzoic acid*

A mixture of 10 g. of 2-amino-4-hydroxy-7-bromomethylpteridine and 20 g. of ethyl p-aminobenzoate was added to 400 cc. of ethylene glycol and the suspension heated with stirring at 110–115°. After five hours the solution was cooled, diluted with 500 cc. of ethanol and the precipitate filtered. The product was dissolved in 2 liters of .2N sodium hydroxide solution and allowed to stand at room temperature for fifteen hours. The solution was neutralized at pH 3 and filtered. The crude product was purified by dissolving it in dilute sodium hydroxide solution and precipitating at pH 3. The yield was 1.8 grams.

It is to be understood that the foregoing examples may be varied widely with respect to the reactants, the amounts thereof and the conditions thereof without departing from the scope of the invention. While the glutamic acid derivative of Example 1 is the preferred embodiment of our invention it is also contemplated that other amino acids may be substituted for the plutamic acid in the chemical compound of Example 1. The manner of accomplishing this substitution is apparent to anyone familiar with the chemistry of amino acids from a consideration of the examples referred to previously.

By means of the present invention a new class of chemical compounds having desirable folic acid displacing properties is made available to the pharmaceutical and medical professions. These compounds may be readily prepared and compounded in a wide variety of menstrua for treatment of individuals suffering from numerous disorders of a bacterial or other type.

As many apparently widely different embodiments of this invention may be made without departing from the spirit and scope hereof, it is to be understood that this invention is not limited to the specific embodiments hereof except as defined in the appended claims.

We claim:

1. A displacing agent for folic acid comprising 4(((2-amino-4-hydroxy-7-pteridyl) methyl)-amino) benzoic acid.

2. A displacing agent for folic acid having the following general formula:

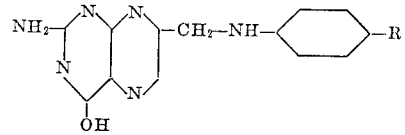

wherein R represents a member selected from the class consisting of carboxylic acid and glutamic acide amide radicals.

3. The compound N(4(((2-amino-4-hydroxy-7-pteridyl) methyl) amino) benzoyl) glutamic acid having the following structure:

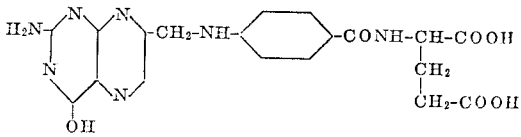

SOUREN AVAKIAN.
GUSTAV J. MARTIN.

REFERENCES CITED

The following references are of record in the file of this patent:

UNITED STATES PATENTS

| Number | Name | Date |
| --- | --- | --- |
| 2,442,836 | Angier | June 8, 1948 |

OTHER REFERENCES

Geschikter: J. A. M. A., Feb. 1, 1930, pp. 326–328.

J. A. M. A. 94, 1845, 1864, 1865 (1930).

Kaplan: Am. J. Cancer, pp. 210–213 (1932).